United States Patent
Wakatsuki (10) Patent No.: US 10,507,729 B2
(45) Date of Patent: Dec. 17, 2019

(54) GRAPHIC METER

(71) Applicant: Yazaki Corporation, Minato-ku, Tokyo (JP)

(72) Inventor: Tomotake Wakatsuki, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 330 days.

(21) Appl. No.: 15/140,610

(22) Filed: Apr. 28, 2016

(65) Prior Publication Data

US 2016/0236570 A1 Aug. 18, 2016

Related U.S. Application Data

(63) Continuation of application No. PCT/JP2014/081974, filed on Dec. 3, 2014.

(30) Foreign Application Priority Data

Dec. 3, 2013 (JP) .................................. 2013-249962

(51) Int. Cl.
*B60K 35/00* (2006.01)
*G06F 3/14* (2006.01)

(52) U.S. Cl.
CPC ................ *B60K 35/00* (2013.01); *G06F 3/14* (2013.01); *B60K 2370/1868* (2019.05); *B60K 2370/52* (2019.05)

(58) Field of Classification Search
CPC .............. G06T 15/50–87; G06F 3/048; B60K 2370/155
See application file for complete search history.

(56) References Cited

U.S. PATENT DOCUMENTS

| 2012/0242656 A1* | 9/2012 | McArdle ................. G06T 15/20 345/419 |
| 2012/0242664 A1* | 9/2012 | Athans .................... G06T 15/50 345/426 |
| 2015/0187128 A1* | 7/2015 | Jones ...................... G06T 15/60 345/426 |

FOREIGN PATENT DOCUMENTS

| DE | 10 2007 061 733 A1 | 6/2009 |
| JP | 2004-341941 A | 12/2004 |
| JP | 2007-030531 A | 2/2007 |
| JP | 2007-099014 A | 4/2007 |

(Continued)

OTHER PUBLICATIONS

Feb. 24, 2015—Written Opinion—App PCT/JP2014/081974.

(Continued)

*Primary Examiner* — Jennifer N To
*Assistant Examiner* — Liang Y Li
(74) *Attorney, Agent, or Firm* — Banner & Witcoff, Ltd.

(57) ABSTRACT

A graphic meter mounted on a vehicle is provided with a display unit of an image display type, which displays an instrument of the vehicle, an acquisition unit which acquires a course information indicating a course of the vehicle and a control unit which is connected to the display unit and the acquisition unit. The control unit controls a display content of a highlight which is displayed in the instrument of the display unit based on a position of a virtual light source located in a virtual space projected on a plane surface. The control unit identifies a change of the course of the vehicle based on the course information acquired by the acquisition unit, and causes the virtual light source to move, according to a result of the identification.

5 Claims, 8 Drawing Sheets

(56) References Cited

FOREIGN PATENT DOCUMENTS

| | | |
|---|---|---|
| JP | 2009-241834 A | 10/2009 |
| JP | 2009-244701 A | 10/2009 |
| JP | 2009-276943 A | 11/2009 |
| JP | 2010-058633 A | 3/2010 |
| JP | 2011-121544 A | 6/2011 |
| JP | 2012-210828 A | 11/2012 |
| JP | 2014-213636 A | 11/2014 |

OTHER PUBLICATIONS

Aug. 15, 2017—(JP) Notification of Reasons for Refusal—App 2013-249962, Eng Tran.
Feb. 24, 2015—International Search Report—Intl App PCT/JP2014/081974.
May 17, 2009—(DE) Official Communication—App 11 2014 005 513.1, Eng Tran.

* cited by examiner

⇐ DIRCTION IN WHICH LIGHT PROPAGATES

⇐ DIRECTION IN WHICH VEHICLE TRAVELS

GRAPHIC METER

CROSS REFERENCE TO RELATED APPLICATIONS

This application is a continuation of PCT application No. PCT/JP2014/081974, which was filed on Dec. 3, 2014 based on Japanese Patent Application (No. 2013-249962) filed on Dec. 3, 2013, the contents of which are incorporated herein by reference.

BACKGROUND OF THE INVENTION

Field of the Invention
The present invention relates to a graphic meter.
Background Art
An analog meter that displays information which indicates a state of a vehicle, such as a speed of a vehicle or revolutions per minute (RPM) of an engine, by moving a real world pointer, or a digital meter that displays information by digitally displaying numbers or characters is known, as a meter unit for a vehicle in the related art.

Furthermore, in recent years, graphic meters also have been provided that display an image of a virtual meter (an instrument) with three-dimensional computer graphics, using a liquid crystal display panel and the like on which an arbitrary image is able to be displayed graphically (refer to Patent Literature 1: JP-A-2011-121544 and Patent Literature 2: JP-A-2007-99014).

DESCRIPTION OF RELATED ART

[Patent Literature 1] JP-A-2011-121544
[Patent Literature 2] JP-A-2007-99014

A graphic meter in Patent Literature 1 is provided for the purpose of reproducing texture or solidity of a real world instrument (that is, an instrument such as an analog meter). In the graphic meter in Patent Literature 1, a virtual instrument is arranged in a virtual space, virtual light from a virtual light source is emitted to the instrument, and thus reflected light or a shadow is formed on a frame portion of the instrument. Then, an image that appears when the reflected light or the shadow is viewed from a virtual viewpoint is displayed on a display device of a vehicle. On this occasion, a position of the virtual light source is moved according to a speed of a vehicle or revolutions per minute of an engine (or the position of the virtual light source is moved with the passage of time or randomly). Accordingly, the reflected light or the shadow on a surface of the instrument is changed, and thus improvement on image reality or solidity is achieved.

Furthermore, a graphic meter in Patent Literature 2 is provided for the purpose of reducing a feeling of being uncomfortable with a glossy appearance of an image of an object that is displayed and with the glossiness of a real world object, which occurs due to external light. In the graphic meter in Patent Literature 2, a virtual light source is set based on detected external light, and an image of equipment for a vehicle is displayed reflecting an influence of light from the virtual light source, in order to accomplish the purpose.

In recent years, high quality graphic meters in which reproducibility of texture or solidity of an instrument that uses a real world object is further improved have been required.

SUMMARY

One or more embodiments provide a graphic meter which is capable of realizing displaying almost to the extent of texture or solidity of an instrument which uses a real world object.

In an aspect (1), one or more embodiments provide a graphic meter provided with a display unit of an image display type, which displays an instrument of the vehicle, an acquisition unit which acquires a course information indicating a course of the vehicle and a control unit which is connected to the display unit and the acquisition unit and which controls a display content of a highlight which is displayed in the instrument of the display unit based on a position of a virtual light source located in a virtual space projected on a plane surface. The control unit identifies a change of the course of the vehicle based on the course information acquired by the acquisition unit, and causes the virtual light source to move, according to a result of the identification.

In an aspect (2), the control unit causes the virtual light source to move above a straight line extending in a horizontal direction in the virtual space.

In an aspect (3), the control unit causes the virtual light source to move between a predetermined first position and a predetermined second position, switches to the first position to move the virtual light source in a case where the virtual light source reaches the second position, and, at a time of the switching, positions the virtual light source at both the first position and the second position.

In an aspect (4), the control unit positions the virtual light sources in a state that brightness is lower than usual at both the first position and the second position at the time of the switching.

In an aspect (5), the course information includes information of a steering angle of the vehicle.

In an aspect (6), the course information further includes information of a traveling speed of the vehicle.

According to the aspect (1), when a course of a vehicle changes, a position of a virtual light source in a virtual space changes, and thus display contents of a highlight on an instrument change. The highlight is a display element that is drawn by imitating a reflected image of a light source that is visually recognized in a case where light from a light source is incident on a surface of a real world object and is reflected from the surface. For example, a portion on which the highlight is performed is illuminated more brightly than the other portions, and thus drawing is performed.

With the instrument that uses a real world object, when the course of the vehicle changes, because an angle at which sunlight is incident on the instrument changes, a position on the instrument, which the sunlight is reflected off of, also changes. For this reason, in order to realize the displaying almost to the extent of texture or solidity of the instrument that uses a real world object, it is preferable that the display contents of the highlight also change in the graphic meter in a case where the course of the vehicle changes. Furthermore, in order to realize the displaying of the highlight almost to the extent of the texture or the solidity of the instrument that uses a real world object, it is preferable that the display contents of the highlight are controlled by calculation that uses the virtual light source which is arranged in the virtual space.

In this respect, in the graphic meter in the aspect (1), when the course of the vehicle changes, the position of the virtual light source in the virtual space changes, and thus the display contents of the highlight on the instrument change. Because of this, the displaying can be realized almost to the extent of the texture or the solidity of the instrument that uses a real world object.

According to the aspect (2), the virtual light source moves above a straight line that extends in a horizontal direction in the virtual space. In the instrument that uses a real world object, it is impossible for sunlight to be incident vertically on the instrument directly from under the horizontal line (that is, from a driver's foot side). For this reason, as in the graphic meter in the aspect (2), if a configuration is employed in which the highlight moves above a straight line that extends in the horizontal direction, the display can be realized in almost the same manner as in the instrument that uses a real world object. Moreover, the straight line that extends in the horizontal direction may be a horizontal line and may be a straight line that is positioned above or under the horizontal line. For example, the straight line can be determined based on a height at which the graphic meter is mounted in the vehicle.

According to the aspect (3), the virtual light source moves between a predetermined first position and a predetermined second position in a predetermined virtual space. Then, in a case where, while movement from the first position toward the second position is in progress, the virtual light source reaches the second position, a position of the virtual light source is switched to the first position. On this occasion, in the graphic meter in the aspect (3), when the position of the virtual light source is switched, because the virtual light source is positioned at both the first position and the second position, the switching can be performed smoothly. That is, when at the time of the switching, the virtual light source disappears at the first position, and then appears at the second position, there is a concern that this will give a viewer (a driver) a feeling of being uncomfortable. However, because, in the graphic meter in the aspect (3), the virtual light source is positioned at both the first position and the second position at the time of the switching, the feeling of being uncomfortable that is apt to occur at the time of the switching of the position of the virtual light source can be suppressed from occurring.

According to the aspect (4) described above, because the virtual light source that is positioned at the first position and the second position at the time of the switching is in a state where brightness is lower than usual, it is difficult for the highlight, which is displayed based on the virtual light source, to be conspicuous, and the feeling of being uncomfortable that is apt to occur at the time of the switching of the position of the virtual light source can be effectively suppressed from occurring.

With the graphic meter in the aspect (5), because it is identified that the course of the vehicle changes, based on a steering angle, it can be reliably identified that the course of the vehicle changes.

With the graphic meter in the aspect (6), because it is identified that the course of the vehicle changes, based on the steering angle and a traveling speed, it can be reliably identified that the course of the vehicle changes and the amount of change that takes place in the course can be identified.

According to one or more embodiments, a graphic meter that is able to realize displaying almost to the extent of texture or solidity of an instrument that uses a real world object can be provided.

BRIEF DESCRIPTION OF THE DRAWINGS

FIGS. 4A and 4B are diagrams for describing transition of details of display on a display unit that accompanies a course change.

FIGS. 5A and 5B are diagrams that illustrate a position of a virtual light source and a display position of a highlight in a case where the course change angle θ ranges from 0° to 90°. FIG. 5A is a diagram illustrating the position of the virtual light source.

FIGS. 6A and 6B are diagrams that illustrate the position of the virtual light source and the display position of the highlight in a case where the course change angle θ ranges from 90° to 180°. FIG. 6A is a diagram illustrating the position of the virtual light source.

FIGS. 7A and 7B are diagrams that illustrate the position of the virtual light source and the display position of the highlight in a case where the course change angle θ is 90°. FIG. 7A is a diagram illustrating the position of the virtual light source. FIG. 7B is a diagram illustrating the speedometer.

DETAILED DESCRIPTION

A graphic meter according to a specific embodiment of the present invention will be described below referring to FIGS. 1 to 8.

A graphic meter 100 according to the present embodiment is a meter unit that is mounted in a vehicle such as an automobile in order to be used, and is installed in an instrument panel in the vehicle in such a manner that a driver can view the meter unit.

Figure 1:
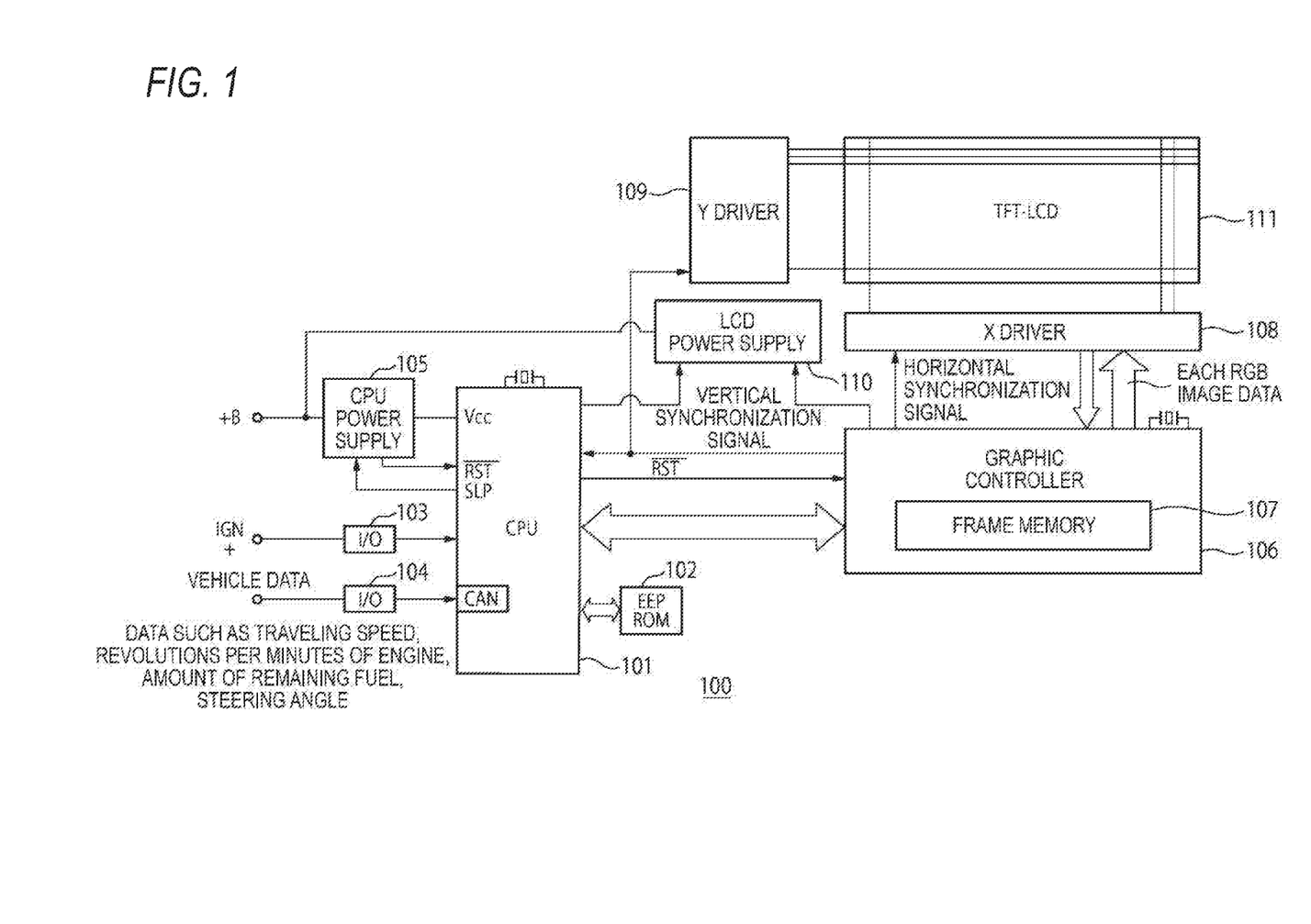
FIG. 1 is a block diagram illustrating an example of a hardware configuration of a graphic meter.

First, a configuration of each unit of the graphic meter 100 is described. FIG. 1 is a block diagram illustrating an example of a hardware configuration of the graphic meter 100. As illustrated in FIG. 1, the graphic meter 100 includes a control unit (a microcomputer, or a central processing unit (CPU)) 101, a readable dedicated memory (an electrically erasable programmable read only memory (EEPROM)) 102, an interface 103, an interface 104 (an acquisition unit), a CPU power supply unit 105, a graphic controller 106, a frame memory 107, an X driver 108, a Y driver 109, a liquid crystal display (LCD) power supply unit 110, a display unit (a liquid crystal display or a thin film transistor liquid crystal display (TFT-LCD)) 111, and the like.

The control unit 101 is, for example, a microcomputer, and executes an operation program that is retained in the readable dedicated memory that is prepared in advance, and performs various necessary processing operations to realize a function of the graphic meter 100. For example, the control unit 101 performs processing that is illustrated in a flowchart in FIGS. 4A and 4B, which will be described below. Furthermore, the control unit 101 has a random access memory (RAM) built into it. Various pieces of data are temporarily stored in the RAM.

The readable dedicated memory 102 is, for example, an EEPROM, and retains details of the operation program that is executed by the control unit 101, or various pieces of fixed data, such as display data for displaying highlights 51, 52, and 53 that will be described below.

The interface 103 inputs a signal (IGN+) indicating a state of an ignition switch on the vehicle side, into the control unit 101.

The interface 104 (the acquisition unit) is used to perform communication in compliance with specifications for a controller area network (CAN) between the control unit 101 and various control devices (an electric control unit (ECU)) on the vehicle side. Specifically, pieces of data indicating current values of various state quantities of the vehicle, such as a traveling speed, a value of excessively supplied pressure, the amount of remaining fuel, and a steering angle are, as almost real-time pieces of data, input from the vehicle side into the control unit 101 through the interface 104.

For example, the interface 104 receives a vehicle speed pulse signal that is output from a speed sensor that is mounted on the vehicle side, each time the vehicle travels a predetermined distance, and outputs the vehicle speed pulse signal, as traveling speed information indicating a value of a current traveling speed of the vehicle, to the control unit 101. Furthermore, the interface 104 receives information on the amount of fuel that is detected by a fuel sensor, and outputs the information to the control unit 101. Furthermore, the interface 104 receives a signal indicating a current value of excessively supplied pressure that is output from a pressure sensor which detects pressure of air that is forcibly introduced by a supercharger into an internal combustion engine and is compressed, and outputs the signal, as excessively supplied pressure information indicating the current value of excessively supplied pressure, to the control unit 101. Furthermore, the interface 104 receives a signal indicating a steering angle that is detected by a steering angle sensor which is provided in the vicinity of a steering wheel, and outputs the signal, as steering angle information indicating a current steering angle, to the control unit 101. The control unit 101 can know a course of the vehicle based on the steering angle information. That is, the interface 104 functions as an acquisition unit through which the control unit 101 acquires course information indicating the course of the vehicle.

The CPU power supply unit 105 inputs direct current power that is supplied from a positive-side power supply line (+B) on the vehicle side, and generates direct current voltage (Vcc) necessary for operation of the control unit 101. Furthermore, a reset signal is generated whenever necessary, or an operation for suppressing power supply is also performed according to a sleep signal that is output from the control unit 101.

The display unit 111 is configured as, for example, a liquid crystal display that is a TFT-LCD, and has a two-dimensional color display screen in which multiple micro display cells that constitute a liquid crystal device are arranged side by side in the X direction and the Y-direction. The display unit 111 is an image display type display device that can display desired information in a graphic form, such as a diagram, a character, an image, and the like, on the two-dimensional display screen by individually controlling a display state of each of the multiple micro display cells. Moreover, the display unit 111 may be configured as a cathode ray tube (CRT) display, an organic electro luminescence (EL) display, a plasma display panel (PDP) display, or the like.

Scan positions in the Y direction, on a graphic display screen 111a of the display unit 111 are sequentially switched by an output of the Y driver 109. The Y driver 109 is synchronized to a vertical synchronization signal that is output from the graphic controller 106, and sequentially switches the scanning positions in the Y direction. The X driver 108 is synchronized to a horizontal synchronization signal that is output from the graphic controller 106, and sequentially switches scanning positions in the X direction, of the display unit 111. Furthermore, the X driver 108 assigns RGB image data that is output from the graphic controller 106 to a display cell at the scanning position and controls display contents on the screen.

The graphic controller 106 displays various graphic elements on a screen of the display unit 111 according to various commands that are input form the control unit 101. In practice, the control unit 101 or the graphic controller 106 writes the display data to the frame memory 107 that retains the display contents which are generated in each pixel, and performs graphic drawing. Furthermore, the graphic controller 106 generates the vertical synchronization signal and the horizontal synchronization signal for scanning the screen of the display unit 111 in a two-dimensional manner, and, at a timing that is synchronized to these synchronization signals, gives the display data that is stored at a corresponding address on the frame memory 107, to the display unit 111.

The LCD power supply unit 110 inputs the direct current power that is supplied from the positive-side power supply line (+B) on the vehicle side, and generates predetermined direct power necessary for display on the display unit 111.

Figure 2:
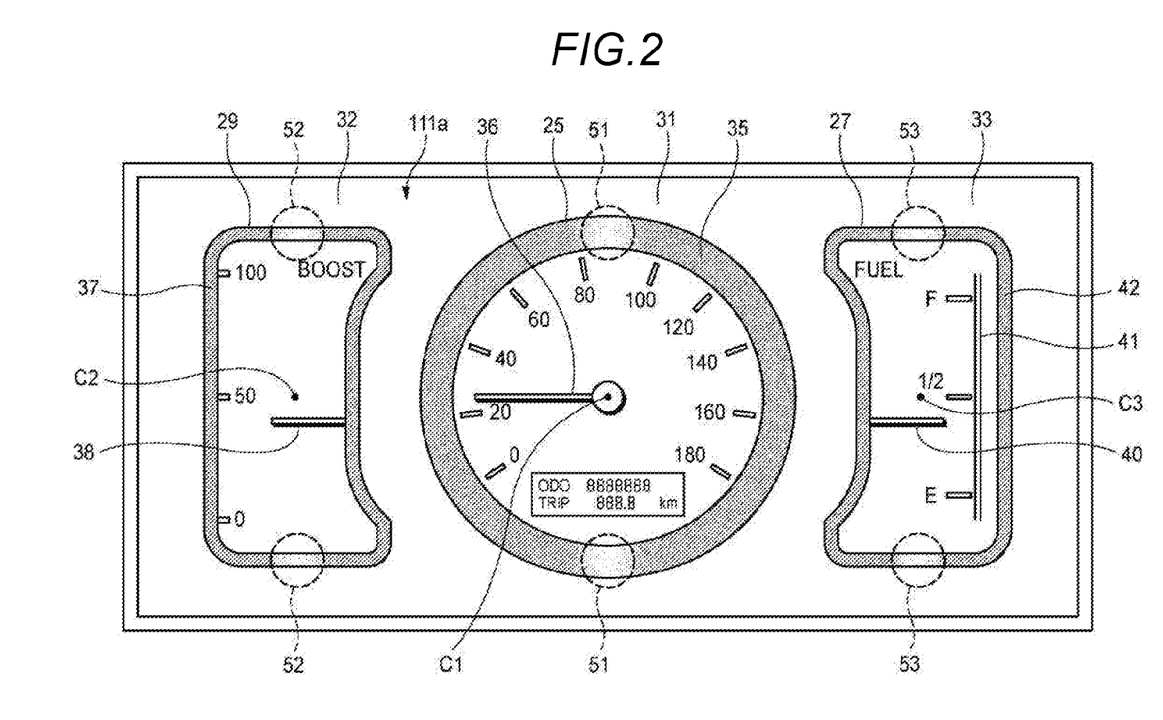
FIG. 2 is a diagram illustrating a graphic display screen of a display unit.

FIG. 2 is a diagram illustrating a graphic display screen 111a of the display unit 111. The graphic display screen 111a has a first display region 31, a second display region 32, and a third display region 33, which are different from each other in terms of a region on which to display.

The first display region 31 is a region for displaying a current traveling speed of a vehicle. An annular frame body 35 and a pointer 36, as a speedometer 25, are displayed on the first display region 31. A scale is arranged inside the frame body 35, and one portion of the frame body 35 also functions as a speed scale. The tip of the pointer 36 points to a portion that functions as the speed scale on the frame body 35, and thus the pointer 36 indicates the current traveling speed of the vehicle. Furthermore, in the graphic meter 100 according to the present embodiment, the highlight 51 is performed on one portion of the frame body 35. The highlight 51 is a display element that imitates a reflected image of a light source that is visually recognized in a case where light from a light source is incident on a surface of a real world object and is reflected from the surface. A portion on which the highlight 51 is performed is illuminated more brightly than the other portions and thus drawing is performed (also refer to FIGS. 4A and 4B). The highlight 51 is displayed on an arbitrary position on the frame body 35. As will be described below, in the graphic meter 100 according to the present embodiment, the highlight 51 is used to achieve realization of displaying on an instrument almost to the extent of texture or solidity of a real world object by changing a display position of the highlight 51. In an example in FIG. 2, the highlight 51 is displayed on a position just over or under the center C1 (a reference position) of the frame body 35.

The second display region 32 is a region for displaying an amount that represents the current value of excessively supplied pressure. A frame body 37 and a pointer 38, as a boost gauge 29, are displayed on the second display region 32. The frame body 37 has a scale arranged inside of it, and one portion of the frame body 37 also functions as a scale for a pressure value. The tip of the pointer 38 points to a portion that functions as the scale for the pressure value on the frame body 37, and thus the pointer 38 indicates the current value of excessively supplied pressure. Furthermore, the highlight 52 is performed on one portion of the frame body 37. In the example in FIG. 2, the highlight 52 is displayed on a position just over or under the center C2 (a reference position) of the frame body 37. That is, the position of the highlight 52 with respect to the center C2 of the frame body 37 corresponds to the position of the highlight 51 with respect to the center C1 of the frame body 35. The highlight 52 is displayed moving on the frame body 37 in such a manner as to correspond to the changing of the display position of the highlight 51 on the frame body 35.

The third display region 33 is a region for displaying a current amount of remaining fuel. A frame body 42, a fuel scale 41, and a pointer 40, as a fuel gauge 27, are displayed on the third display region 33. The fuel scale 41 and the pointer 40 are arranged inside of the frame body 42. The pointer 40 points to one portion of the fuel scale 41, and thus indicates the current amount of remaining fuel. Furthermore, the highlight 53 is performed on one portion of the frame body 42. In the example in FIG. 2, the highlight 53 is displayed on a position just over or under the center C3 (a reference position) of the frame body 42. That is, the position of the highlight 53 with respect to the center C3 of the frame body 42 corresponds to the position of the highlight 51 with respect to the center C1 of the frame body 35. The highlight 53 is displayed moving on the frame body 42 in such a manner as to correspond to the changing of the display position of the highlight 51 on the frame body 35.

Figure 3:
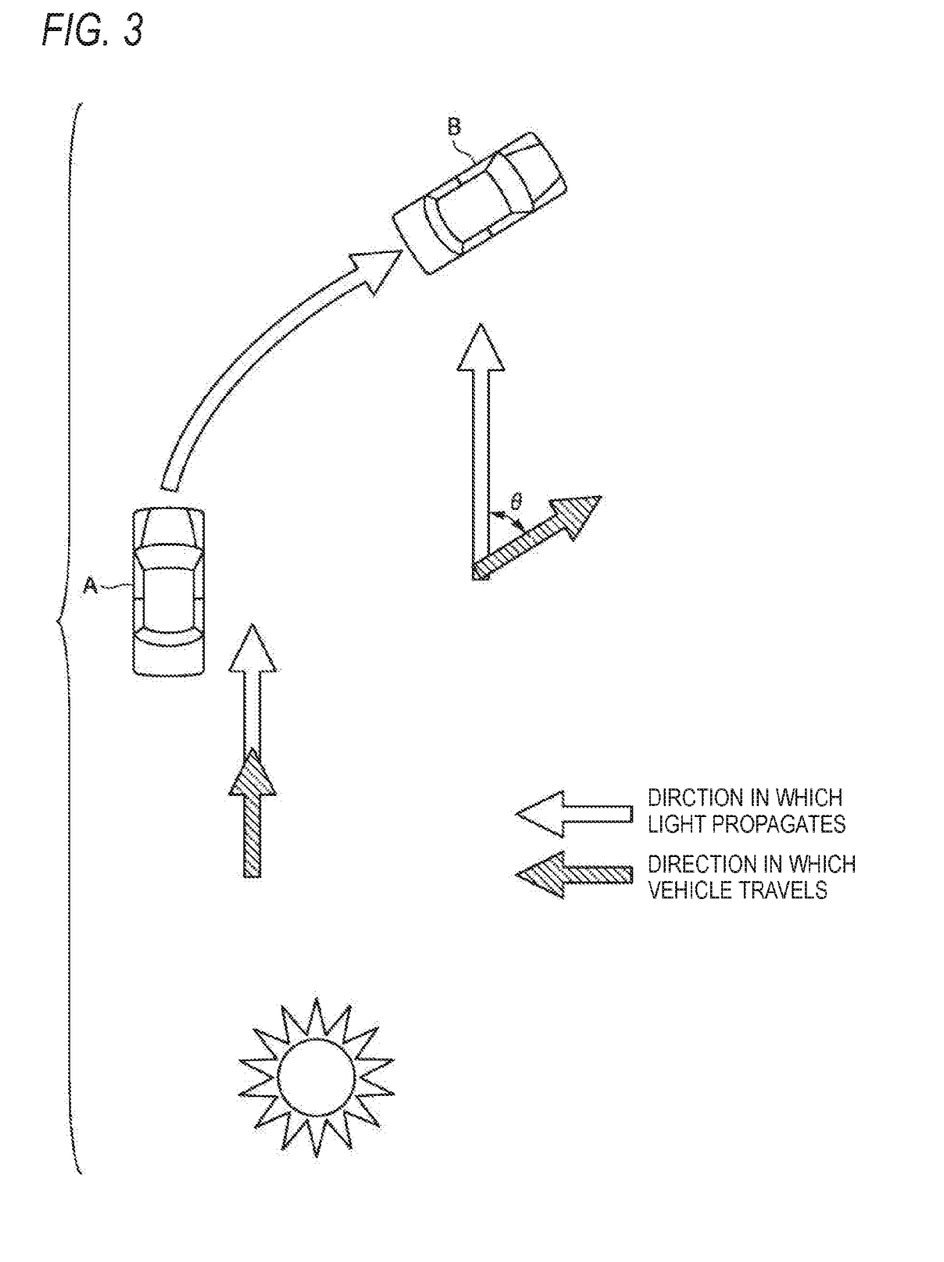
FIG. 3 is a schematic diagram illustrating a vehicle that is changing course.
Figure 4A:
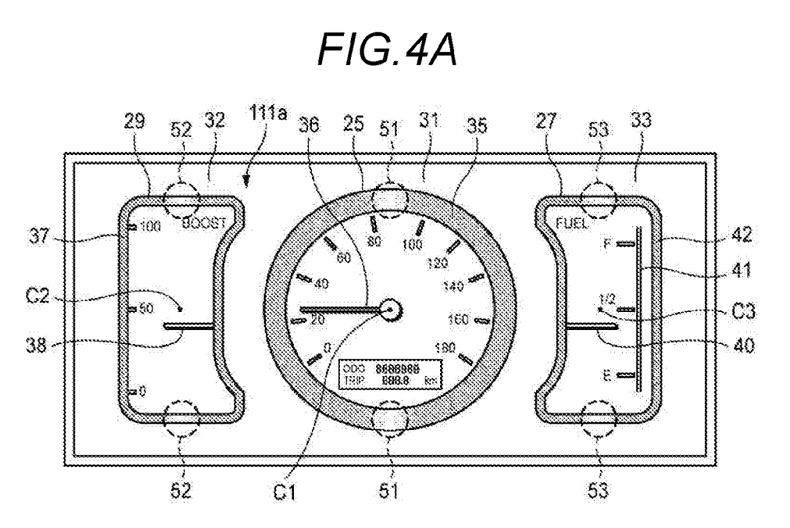
FIG. 4A is a diagram illustrating the details of the display on the display unit before the course changes.
Figure 4B:
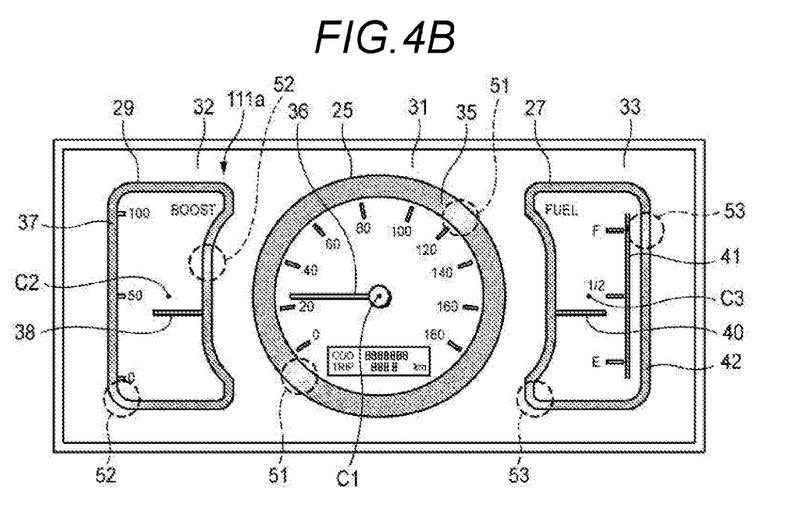
FIG. 4B is a diagram illustrating the details of the display on the display unit after the course changes.

Next, an example in which display transition takes place in the graphic meter 100 is described referring to FIGS. 3 to 4B. FIG. 3 is a schematic diagram illustrating a vehicle that is changing course. FIGS. 4A and 4B are diagrams for describing transition of details of display on the display unit that accompanies a course change. FIG. 4A is a diagram illustrating the details of the display on the display unit before the course changes. FIG. 4B is a diagram illustrating the details of the display on the display unit after the course changes.

FIGS. 3 to 4B illustrate an example of a case where a vehicle that travels straight ahead in the same direction as a direction in which sunlight travels changes its course by approximately as much as 45°. In FIG. 3, a vehicle that has not yet changed course is indicated by reference character A and a vehicle that has changed course is indicated by reference character B. In a case of an example that is illustrated in FIGS. 3 to 4B, before the course has been changed, the highlights 51, 52, and 53, as illustrated in FIG. 4A, are displayed just over or under the centers C1, C2, and C3, respectively, and, after the course has been changed clockwise by as much as 45° with respect to a traveling direction, the highlights 51, 52, 53, as illustrated in FIG. 4B, are displayed on positions that overlap when the initial positions rotate clockwise by approximately as much as 45° with respect to the centers C1, C2, and C3, respectively.

Moreover, in the display example described above, the display contents that are available before and after the course has been changed by approximately as much as 45° are described, but the display contents are successively changed according to a change in a course change angle of θ°. For example, when an angle by which the course is changed is defined as the course change angle of θ, before the course has been changed, the highlights 51, 52, and 53, as illustrated in FIG. 4A, are displayed just over or under the centers C1, C2, and C3, respectively, and at a point in time when the course is changed clockwise by as much as θ° with respect to the traveling direction, the highlights 51, 52, and 53 are displayed on positions that overlap when the initial positions rotate clockwise as much as θ° with respect to the centers C1, C2, and C3, respectively.

In the graphic meter 100 according to the embodiment, the changing of the display contents (the display position) of the highlights 51, 52, and 53 is performed by controlling the display contents of the highlight based on a position of a virtual light source 61 (which will be described below referring to FIGS. 5A to 7B) that is arranged in a virtual space by the control unit 101. More specifically, a virtual instrument is arranged in the virtual space, the virtual light from the virtual light source 61 is emitted to the instrument, and thus reflected light or a shadow is formed on a frame portion of the instrument. Then, the changing of the display contents is performed by displaying on the graphic display screen 111a of the display unit 111 an image that appears when the reflected light or the shadow is viewed from a virtual viewpoint. Moreover, the display positions of the highlights 51, 52, and 53 will be described below as being changed as the display contents, but as will be described below, a configuration may be employed in which not only the display positions of the highlights 51, 52, and 53 but also display intensity and the like are changed according to a position of the virtual light source 61.

Figure 5A:
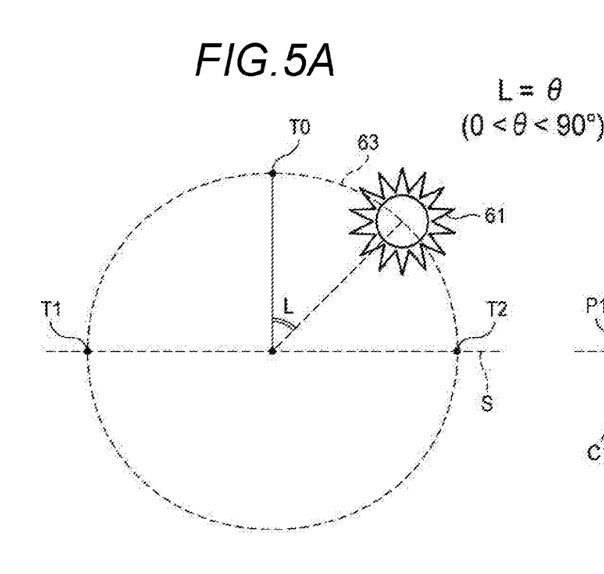
Figure 5B:
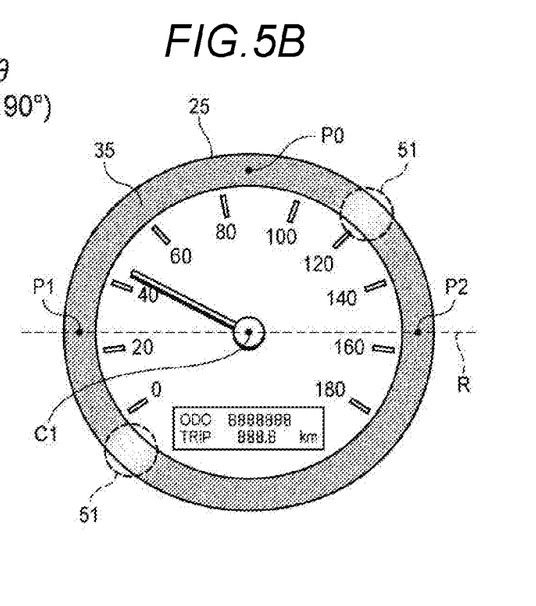
FIG. 5B is a diagram illustrating a speedometer.
Figure 6A:
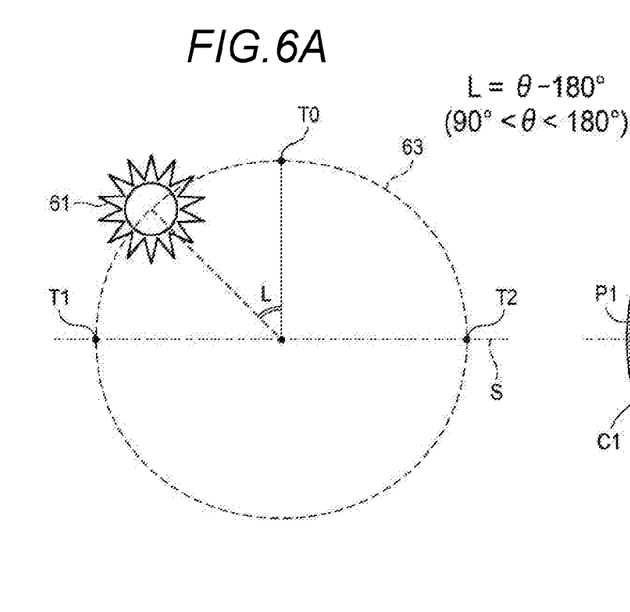
Figure 6B:
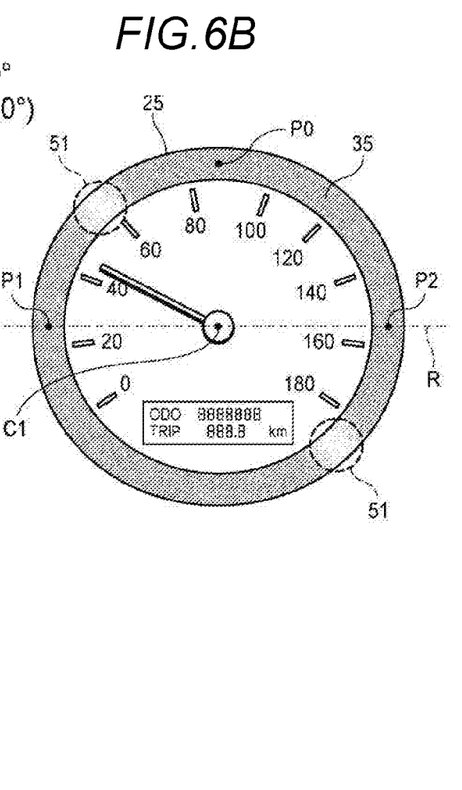
FIG. 6B is a diagram illustrating the speedometer.
Figures 7A, 7B:
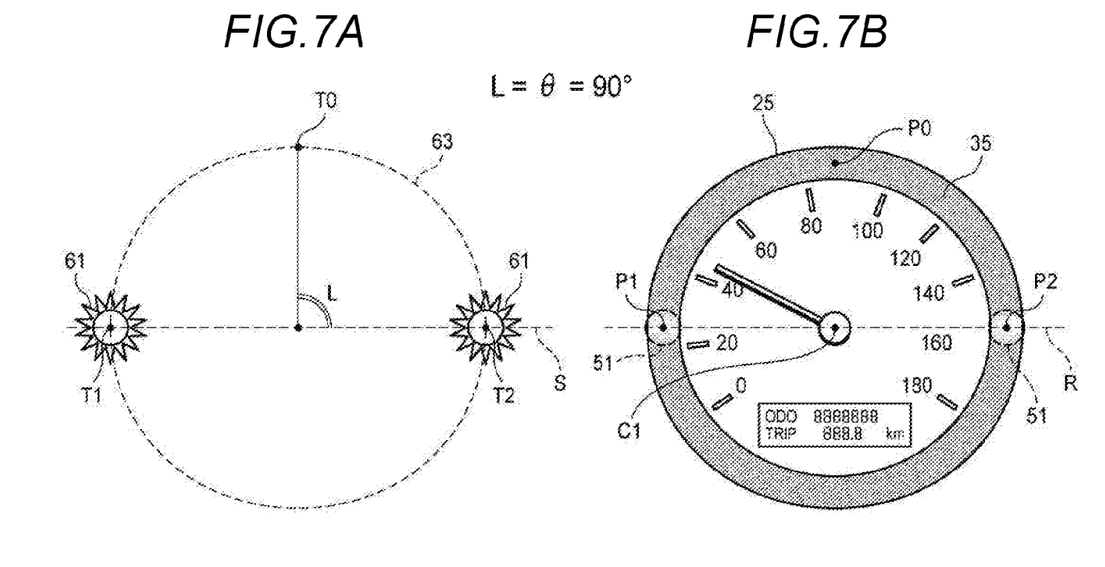

The changing of the display positions of the highlights 51, 52, and 53 that use the virtual light source 61 is described again referring to FIGS. 5A to 7B. FIGS. 5A to 7B illustrate only the speedometer 25 for brief description, but in the same manner, the display position of the highlight also moves on the boost gauge 29 and the fuel gauge 27. FIGS. 5A and 5B are diagrams that illustrate the position of the virtual light source and the display position of the highlight in a case where the course change angle θ ranges from 0° to 90°. FIG. 5A is a diagram illustrating the position of the virtual light source. FIG. 5B is a diagram illustrating the speedometer. FIGS. 6A and 6B are diagrams that illustrate the position of the virtual light source and the display position of the highlight in a case where the course change angle θ ranges from 90° to 180°. FIG. 6A is a diagram illustrating the position of the virtual light source. FIG. 6B is a diagram illustrating the speedometer. FIGS. 7A and 7B are diagrams that illustrate the position of the virtual light source and the display position of the highlight in a case where the course change angle θ is 90°. FIG. 7A is a diagram illustrating the position of the virtual light source. FIG. 7B is a diagram illustrating the speedometer.

As illustrated in FIGS. 5A to 7B, an example is described in which in the graphic meter 100 according to the embodiment, the course change angle θ and a rotational angle L with respect to a point T0 on the virtual light source 61 are set to be equal to each other. However, the course change angle θ and the rotational angle L may correspond to each other. For example, the rotational angle L may be set to be ½ the course change angle θ, and may be set to be 2 times the course change angle θ.

As illustrated in FIG. 5A, in a case where the course change angle θ ranges from 0° to 90° (that is, immediately after a vehicle starts to change a course), the rotational angle L of the virtual light source 61 is an angle that is equal to the course change angle θ (that is, L=θ). Accordingly, while the course change angle θ changes from 0° to 90°, the virtual light source 61 moves from the point T0 on an arc 63 to a point T2 that is an intersection point of the arc 63 and a horizontal line S, and as illustrated in FIG. 5B, the highlight 51 moves clockwise on an upper right half surface and a lower left half surface of the frame body 35.

On the other hand, as illustrated in FIG. 6A, in a case where the course change angle θ ranges from 90° to 180°, the rotational angle L of the virtual light source 61 is an angle that results from subtracting 180° from the course change angle θ (that is, L=θ−180°). Accordingly, while the course change angle θ changes from 90° to 180°, the virtual light source 61 moves from a point T1 that is an intersection point of the arc 63 and the horizontal line S to the point T0 on the arc 63, and as illustrated in FIG. 6B, the highlight 51 moves clockwise on the upper left half surface and the lower right half surface of the frame body 35.

To be more precise, while the course change angle θ changes from 0° to 180°, the virtual light source 61 moves from the point T0 to the point T2 on the arc 63, then moves the point T1, and moves from the point T1 back to the point T0 on the arc 63. That is, when the virtual light source 61 moves between the point T1 (a first position) and the point T2 (a second position) on the arc 63, and reaches the point T2 while moving in a direction from the point T1 to the point T2, the position of the virtual light source 61 changes to the point T1. The display position of the virtual light source 61 is changed in this manner in the case where the course change angle θ ranges from 0° to 90° and in the case where the course change angle θ ranges from 90° to 180° in order for the virtual light source 61 not to be arranged vertically under the horizontal line S. That is, in an instrument that uses a real world object, it is impossible for sunlight to be incident vertically directly from under the horizontal line S (that is, from a driver's foot side). In order to realize the display contents in an environment where the instrument that uses a real world object is imitated, in the graphic meter 100 according to the present embodiment, a configuration is employed in which the virtual light source 61, moves between the point T1 (the first position) and the point T2 (the second position) that are positioned on the horizontal line S, and moves above the horizontal line S.

Accordingly, the display position of the highlight 51 also changes clockwise in accordance with the movement of the virtual light source 61.

Furthermore, in the graphic meter 100 according to the present embodiment, as illustrated in FIG. 7A, when the position of the virtual light source 61 at which the course change angle θ is 90° changes from the point T2 to the point T1, the virtual light source 61 is temporarily positioned at both the point T1 and the point T2. At this time, the virtual light source 61 is positioned at a state where brightness is lower than usual. Accordingly, as illustrated in FIG. 7B, the highlight 51 is displayed in a state where the brightness is lower than usual at both a point P1 and a point P2. In this manner, in the graphic meter 100, when the position of the virtual light source 61 is switched, because the virtual light source 61 is positioned at both the point T1 and the point T2, the switching can be performed smoothly. That is, when at the time of the switching, the virtual light source 61 disappears at the point T2 and then appears at the point T1, there is a concern that this will give a driver a feeling of being uncomfortable, but with the graphic meter 100, the feeling of being uncomfortable can be suppressed from occurring. Particularly, because at the time of the switching, the brightness of the virtual light source 61 is in a state of being lower than usual, it is difficult for the highlights 51, 52, and 53 which are displayed based on the virtual light source 61, to be conspicuous, and the feeling of being uncomfortable can be effectively suppressed from occurring. Moreover, after the switching, as illustrated in FIGS. 6A and 6B, the virtual light source 61 becomes only one again, and moves to the point T0 on the arc 63.

Figure 8:
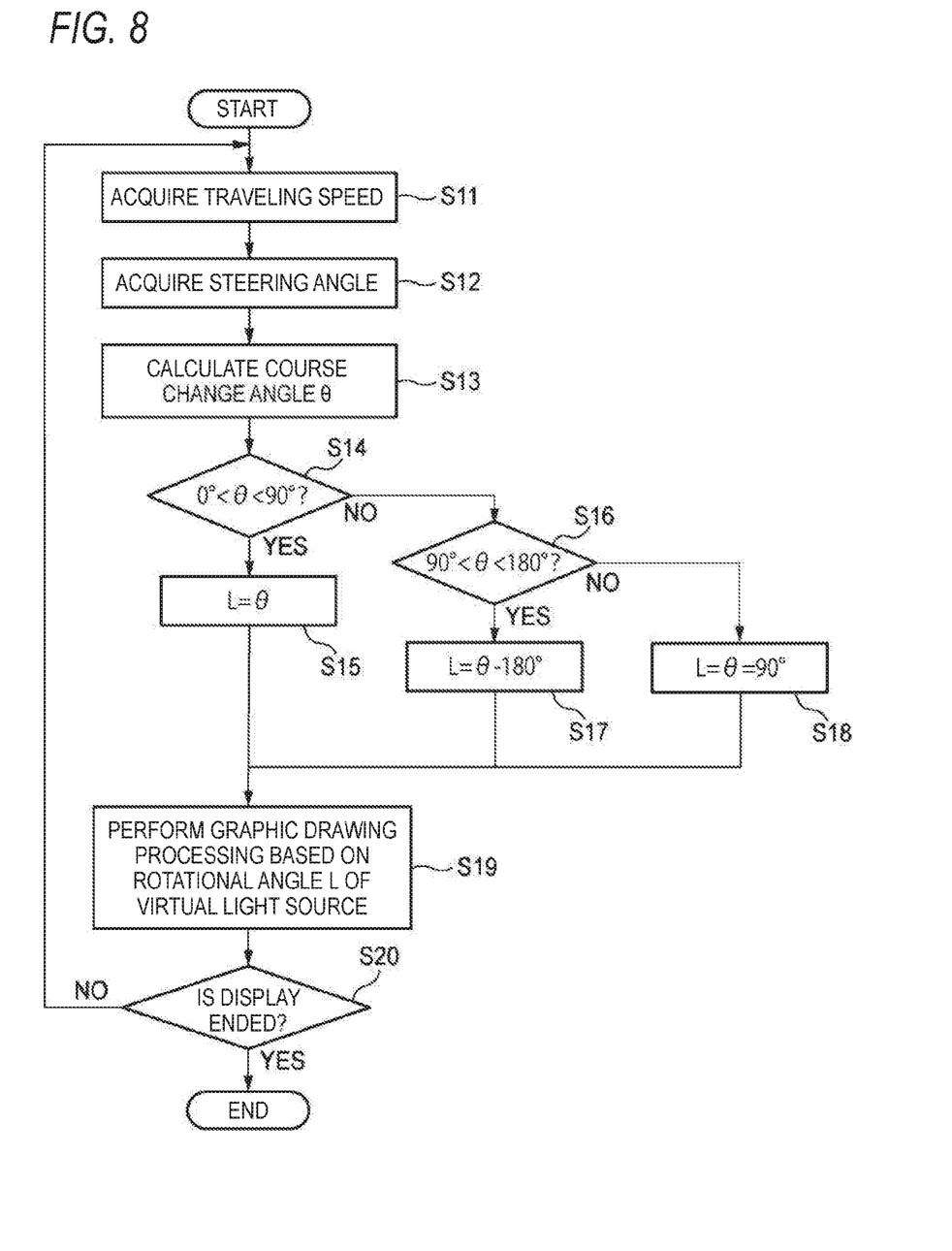
FIG. 8 is a flowchart illustrating a procedure for display processing by a control unit.

Specific operation of the graphic meter 100 that has the configuration described above is illustrated. FIG. 8 is a flowchart illustrating a procedure for display processing by a control unit. The operation program is stored in a ROM 102b, and is executed by the control unit 101. Moreover, details of processing, in which, in the procedure for the processing that will be described below, the control unit 101 controls the display unit 111 to change the display contents on the display unit 111, will be described below. However, in some cases, for brief description and easy understanding, the control unit 101 is described in a simplified manner, changing the display contents.

First, a user turns on an ignition switch. The control unit 101 to which direct current voltage (Vcc) is supplied starts to display various pieces of information including speed information, a value of excessively supplied pressure, and a value of fuel on the first display region 31 to the third display region 33. Display processing of the various pieces of information, although description of them will be omitted below, is sequentially performed and the various pieces of information are updated in real time.

In Step S11, the control unit 101 receives traveling speed information through the interface 104, and knows a current traveling speed of a vehicle.

In Step S12, the control unit 101 receives steering angle information through the interface 104, and knows a current steering angle.

In Step S13, the control unit 101 calculates a course change angle θ that is an angle by which the vehicle changes course during a period of time from a point in time (a first point in time, for example, 5 seconds ago) in the past as a reference to a current point in time (a second point in time), based on the steering angle and the traveling speed of the vehicle. The course change angle θ changes with the steering angle and the traveling speed. Although the traveling speed is constant, if the steering angle is great, the angle θ increases. On the other hand, although the steering angle is constant, if the traveling speed is fast, the course change angle θ increases. According to the present embodiment, on the assumption that the vehicle uses an Ackerman steering mechanism, the control unit 101 calculates the course change angle θ based on the steering angle and the traveling speed of the vehicle. That is, the control unit 101 calculates the course change angle θ using the steering angle and the traveling speed of the vehicle as course information indicating the course of the vehicle.

In Step S14, the control unit 101 identifies whether or not the course change angle θ is greater than 0° but smaller than 90° (that is, 0°<θ<90°). In a case where the control unit 101 identifies that the course change angle θ is greater than 0° but smaller than 90°, in Step S15, the control unit 101 sets the rotational angle L of the virtual light source 61 to an angle that is equal to the course change angle θ (that is, L=θ).

In Step S16, the control unit 101 identifies whether or not the course change angle θ is greater than 90° but smaller than 180° (that is, 90°<θ<180°). In a case where the control unit 101 identifies that the course change angle θ is greater than 90° but smaller than 180°, in Step S17, the control unit 101 sets the rotational angle L of the virtual light source 61 to an angle that results from subtracting 180° from the course change angle θ (that is, L=θ−180).

In Step S18, the control unit 101 identifies that the course change angle θ is 90°, and sets the rotational angle L of the virtual light source 61 to 90° (that is, L=θ=90°).

In Step S19, the control unit 101 executes drawing processing on the graphic display screen 111a, based on the rotational angle L of the virtual light source 61. More specifically, the control unit 101 emits virtual light from the virtual light source 61 that is arranged at the rotational angle L, to the virtual instrument that is arranged in the virtual space, forms reflected light or a shadow on a frame body of the instrument, and displays on the graphic display screen 111*a* of the display unit 111 an image that appears when the reflected light or the shadow is viewed from a virtual viewpoint. As a result, as illustrated in FIGS. 5A to 7B, the highlights 51, 52, and 53 are displayed on positions that overlap when the positions (positions that are indicated by the point P0 in FIGS. 5A to 7B) over the centers C1, C2, and C3 on the frame bodies 35, 37, and 42 rotate clockwise by L°, respectively. Moreover, in a case where the rotational angle L is 90°, the control unit 101, as described above, positions the virtual light source 61 in a state where the brightness is lower than usual at the point T1 and the point T2. Accordingly, as described above, the highlight 51 is displayed in the state where the brightness is lower than usual at both the point P1 and the point P2.

In Step S20, the control unit 101 identifies whether or not the display processing has to end. For example, in a case where the ignition switch is turned off, the control unit 101 ends the display processing. In a case where the display processing does not end, the control unit 101 again performs processing in Step S11.

The processing described above is performed, and thus in the graphic meter 100, when the course of the vehicle changes, the position of the virtual light source 61 in the virtual space changes. Accordingly, the display positions of the highlights 51, 52, and 53 change, corresponding to the amount of change that takes place in the course.

An influence and an effect that are exerted by the graphic meter 100 will be described below.

In the instrument that uses a real world object, in some cases, a frame body of each real world instrument is made of a metal. Furthermore, in some cases, hairline treatment is performed on the metal frame body for the purpose of strengthening lusterlessness and metal texture. The hairline treatment is a treatment method by which fine scratches such as hairs are incurred along a single direction on a metal surface. A metal member on which the hairline treatment is performed causes anisotropic reflection, not specular reflection. In the specular reflection, a form of the light source is reflected onto the metal, but in the anisotropic reflection, the form of the light source is reflected onto the metal in a state of being deformed. For this reason, in a case where the hairline treatment is performed, it is difficult for a viewer to identify the position of the light source from the reflected light.

Therefore, it is thought that, considering properties of the anisotropic reflection, in a case where the metal texture is desirably given to a certain display element in the graphic meter, it is not necessary to perform the display of the highlight, accurately reflecting the position of the sun that is a light source, and that, if a configuration is employed in which the display position of the highlight is simply changed in a case where an angle at which sunlight is incident on the graphic meter is changed, the displaying can be realized almost to the extent of the texture and the solidity of the instrument that uses a real world object.

In the aspects described above, in the graphic meter 100 according to the embodiment, when the course of the vehicle changes, the position of the virtual light source 61 changes by as much as the rotational angle L in accordance with the amount of change that takes place in the course, and thus the display positions of the highlights 51, 52, and 53 on the frame bodies 35, 37, and 42 change. For this reason, because with the graphic meter 100, the texture, like that of the metal on which the hairline treatment is performed, can be given to the frame bodies 35, 37, and 42, the displaying can be realized almost to the extent of the texture or the solidity of the instrument that uses a real world object.

Furthermore, as described above, in the graphic meter 100 according to the embodiment, because the virtual light source 61 moves above the horizontal line S that extends in the horizontal direction, the display contents can be realized in the environment where the instrument that uses a real world object is imitated.

Furthermore, as described above, in the graphic meter 100 according to the embodiment, when the display position of the virtual light source 61 is switched, because the virtual light source 61 is positioned at both the point T1 and the point T2 that are illustrated in FIGS. 5A to 7B, in a state where the brightness is lower than usual, the switching can be smoothly performed.

Characteristics of the graphic meter 100 according to the embodiment are briefly summarized and listed as the following [1] to [6].

[1] A graphic meter 100 mounted on a vehicle comprising:

a display unit 111 of an image display type, which displays an instrument (a speedometer 25, a fuel gauge 27, and a boost gauge 29) of the vehicle;

an acquisition unit (an interface 104) which acquires a course information indicating a course of the vehicle; and a control unit 101 which is connected to the display unit 111 and the acquisition unit, and which controls a display content of a highlight 51, 52, and 53 which is displayed in the instrument of the display unit 111 based on a position of a virtual light source 61 located in a virtual space projected on a plane surface, wherein the control unit 101 identifies a change of the course of the vehicle based on the course information acquired by the acquisition unit, and causes the virtual light source 61 to move, according to a result of the identification.

[2] The graphic meter 100 according to the above-described [1], wherein the control unit 101 causes the virtual light source 61 to move above a straight line (S) extending in a horizontal direction in the virtual space.

[3] The graphic meter 100 according to the above-described [1] or [2], wherein the control unit 101 causes the virtual light source 61 to move between a predetermined first position (T1) and a predetermined second position (T2), switches to the first position to move the virtual light source 61 in a case where the virtual light source 61 reaches the second position, and, at a time of the switching, positions the virtual light source 61 at both the first position and the second position.

[4] The graphic meter 100 according to the above-described [1], wherein the control unit 101 positions the virtual light sources 61 in a state that brightness is lower than usual at both the first position and the second position at the time of the switching.

[5] The graphic meter 100 according to the above-described [1] or [4], wherein the course information includes information of a steering angle of the vehicle.

[6] The graphic meter 100 according to the above-described [5], wherein the course information further includes information of a traveling speed of the vehicle.

Moreover, a technical scope of the present invention is not limited to the embodiment described above. The embodiment described above can accompany various modifications, improvements, and the like within the technical scope of the present invention.

For example, according the embodiment described above, the changing of the course of the vehicle is described as being identified based on the steering angle and the traveling speed, but for example, a configuration may be employed in which the changing of the course of the vehicle is identified based on positional information of the vehicle that is specified based on a global positioning system (GPS) signal.

Furthermore, according to the embodiment, the configuration is employed in which the virtual light source 61 moves over the horizontal line S that extends in the horizontal direction, but a configuration may be employed in which the virtual light source 61 moves above another straight line that is positioned above or below the horizontal line S. That is, according to the embodiment described above, the configuration is employed in which the virtual light source 61 rotates by an angle ranging from −90° (a position at the point T1) to +90° (a position at the point T2) with respect to the center. However, for example, a configuration may be employed in which the virtual light source 61 rotates by an angle ranging from −45° to +45° or a configuration may be employed in which the virtual light source 61 rotates by an angle ranging from −60° to +60°.

The present invention is described in detail or referring to the specific embodiment, but it is apparent to an ordinary person in the art that various changes or modifications can be made without deviating from the spirit and scope of the present invention.

The present application claims the benefit of earlier filing date and right of priority to Japanese Application No. 2013-249962, filed on Dec. 3, 2013, the contents of which are incorporated by reference herein in its entirety.

INDUSTRIAL APPLICABILITY

According to the present invention, an effect is achieved in which displaying can be realized almost to the extent of texture or solidity of an instrument that uses a real world object. The present invention that achieves the effect is useful for a graphic meter.

REFERENCE SIGNS LIST

25 SPEEDOMETER (INSTRUMENT)
27 FUEL GAUGE (INSTRUMENT)
29 BOOST GAUGE (INSTRUMENT)
35, 37, 42 FRAME BODY
51, 52, 53 HIGHLIGHT
61 VIRTUAL LIGHT SOURCE
100 GRAPHIC METER
101 CONTROL UNIT
102 READABLE DEDICATED MEMORY
103 INTERFACE
104 INTERFACE (ACQUISITION UNIT)
105 CPU POWER SUPPLY UNIT
106 GRAPHIC CONTROLLER
107 FRAME MEMORY
108 X DRIVER
109 Y DRIVER
110 LCD POWER SUPPLY UNIT
111 DISPLAY UNIT

What is claimed is:

1. A graphic meter mounted on a vehicle comprising:
a display unit of an image display type, which displays an instrument of the vehicle;
a communication interface which acquires course information indicating a course of the vehicle; and
a processor which is connected to the display unit and the communication interface, and which controls display content of a highlight which is displayed in the instrument, displayed by the display unit, based on a position of a virtual light source located in a virtual space projected on a plane surface,
wherein the processor
identifies a change of the course of the vehicle based on the course information acquired by the communication interface,
causes the virtual light source to move on a path having distinct first and second end points according to a result of the identified change,
calculates a course change angle that is an angle by which the vehicle changes course during a period of time from a point in time in the past as a reference to a current point in time based on the course information acquired by the communication interface,
causes the virtual light source to move in the virtual space according to the course change angle, and
causes the highlight to move along a predetermined cyclic path to a position on an annular frame body which is rotated by an angle according to the course change angle from a predetermined position of the annular frame body of the instrument against a center of the annular frame body,
wherein a position of the virtual light source switches to the first end point based on the virtual light source reaching the second end point.

2. The graphic meter according to claim 1, wherein the processor causes the virtual light source, at a time of the switching, to be positioned at both the first end point and the second end point.

3. The graphic meter according to claim 2, wherein the processor positions the virtual light source, in a state that brightness is lower than normal, at both the first end point and the second end point at the time of the switching.

4. The graphic meter according to claim 1, wherein the course information includes a steering angle of the vehicle.

5. The graphic meter according to claim 4, wherein the course information further includes a traveling speed of the vehicle.

* * * * *